(12) United States Patent
Cheng et al.

(10) Patent No.: US 8,804,067 B2
(45) Date of Patent: Aug. 12, 2014

(54) DISPLAY DEVICE

(75) Inventors: Hui-Chuan Cheng, Taichung (TW); Shin-Tson Wu, Oviedo, FL (US); Jin Yan, Orlando, FL (US); Young-Ran Chuang, Tainan (TW); Ching-Huan Lin, Hsinchu County (TW)

(73) Assignees: Au Optronics Corporation, Hsinchu (TW); University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 13/244,284

(22) Filed: Sep. 24, 2011

(65) Prior Publication Data

US 2012/0307178 A1    Dec. 6, 2012

Related U.S. Application Data

(60) Provisional application No. 61/481,295, filed on May 2, 2011.

(51) Int. Cl.
*G02F 1/1335* (2006.01)

(52) U.S. Cl.
USPC ............................................ 349/62; 349/63

(58) Field of Classification Search
USPC ........................................ 349/112, 62–63
See application file for complete search history.

(56) References Cited

U.S. PATENT DOCUMENTS

| | | | |
|---|---|---|---|
| 6,097,465 A | 8/2000 | Hiroki et al. | |
| 6,166,787 A * | 12/2000 | Akins et al. | 349/57 |
| 7,085,060 B2 * | 8/2006 | Matsushita et al. | 359/599 |
| 8,064,012 B2 * | 11/2011 | Park | 349/112 |
| 2002/0036731 A1 * | 3/2002 | Takahashi et al. | 349/112 |
| 2003/0053009 A1 * | 3/2003 | Sato et al. | 349/95 |
| 2007/0085970 A1 | 4/2007 | Yoshida | |
| 2008/0007677 A1 * | 1/2008 | Enomoto | 349/106 |
| 2009/0027591 A1 * | 1/2009 | Hwang et al. | 349/64 |

FOREIGN PATENT DOCUMENTS

| | | |
|---|---|---|
| CN | 1945403 | 4/2007 |
| CN | 101354453 | 1/2009 |
| JP | 2005-243259 | 9/2005 |
| TW | 200844596 | 11/2008 |
| TW | M359718 | 6/2009 |

OTHER PUBLICATIONS

"Office Action of China Counterpart Application", issued on Apr. 23, 2014, pp. 1-7.

* cited by examiner

*Primary Examiner* — Bumsuk Won
*Assistant Examiner* — Charles Chang
(74) *Attorney, Agent, or Firm* — Jianq Chyun IP Office

(57) ABSTRACT

A display device includes a display module, a light source module and a guiding optical film. The display module includes a first substrate, a second substrate and a display medium. The light source module generates directional light. The display module has a vertical electric field. The display medium is optically isotropic, and the display medium is optically anisotropic when driven by the vertical electric field. The directional light is not perpendicular to the first substrate when the directional light enters the display nodule. The directional light is not perpendicular to the second substrate when the directional light exits the display module. The guiding optical film is disposed on the second substrate and has a light incident surface and a light emitting surface. After the directional light exits the guiding optical film, emitting light is formed, and the emitting light and the light emitting surface has an included angle there between.

19 Claims, 18 Drawing Sheets

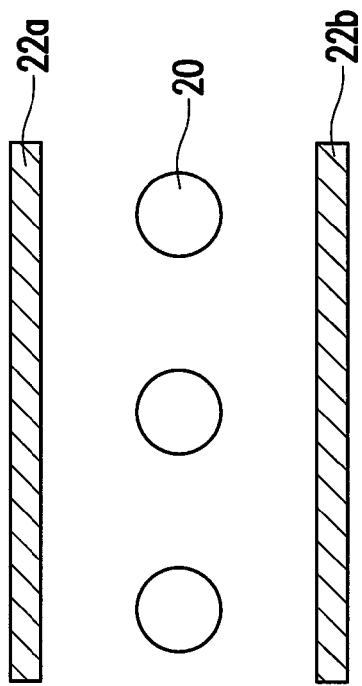
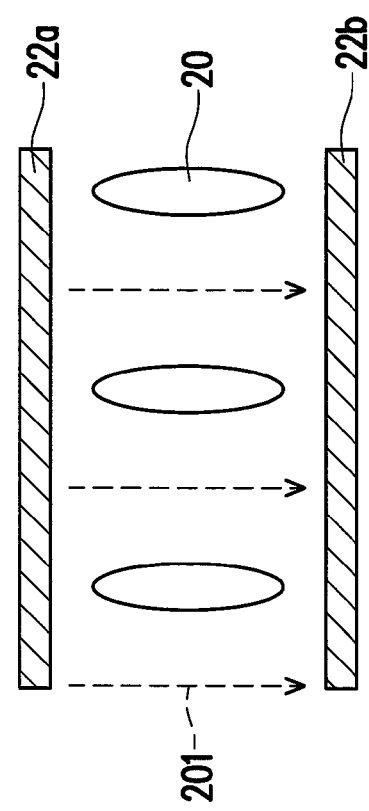

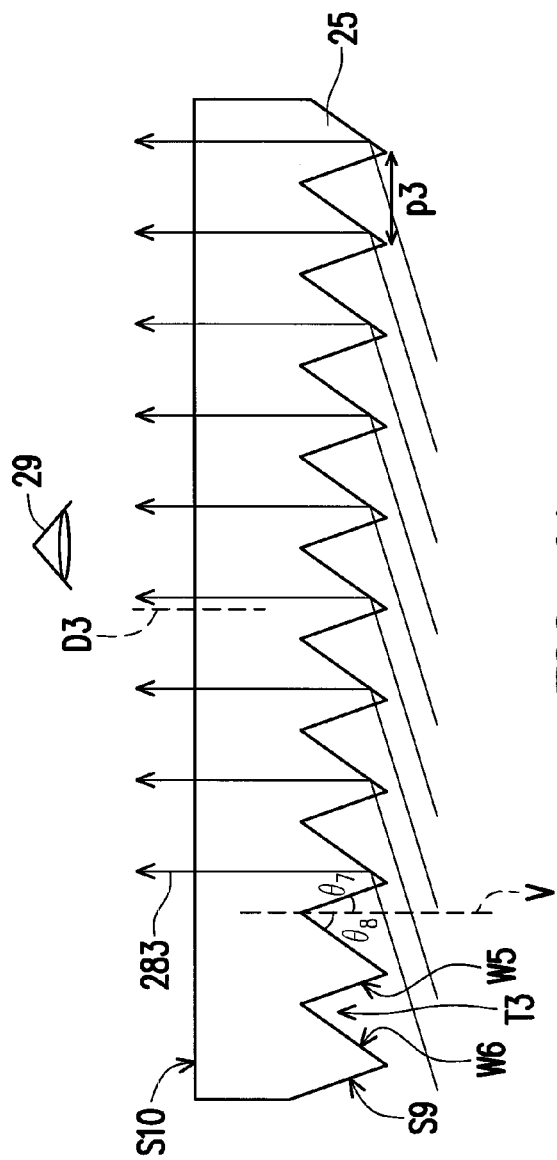
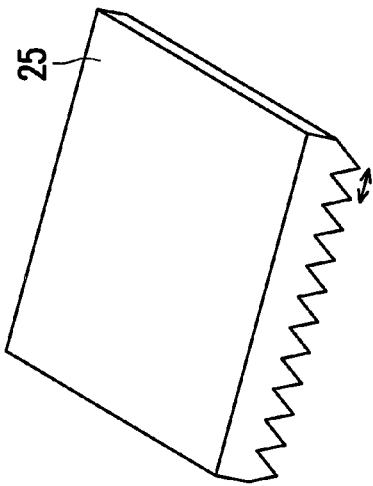
FIG. 6A
FIG. 6B

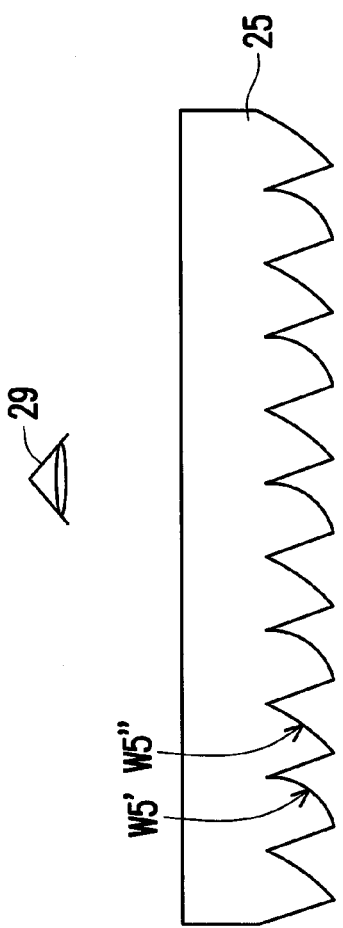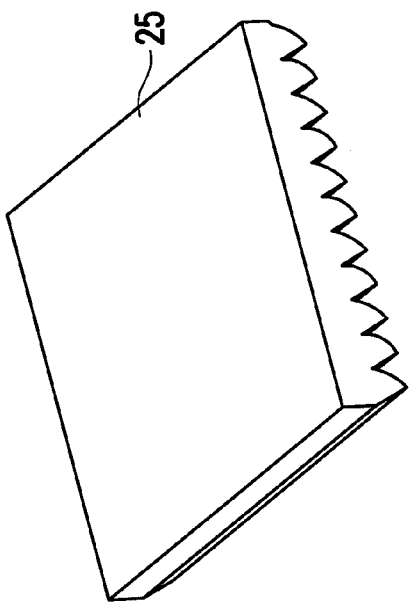
FIG. 9A
FIG. 9B

DISPLAY DEVICE

CROSS-REFERENCE TO RELATED APPLICATION

This application claims the priority benefit of U.S. Provisional Application Ser. No. 61/481,295, filed May 2, 2011. The entirety of the above-mentioned patent application is hereby incorporated by reference herein and made a part of this specification.

BACKGROUND OF THE INVENTION

1. Field of the Invention

The invention relates to a display device. Particularly, the invention relates to a liquid crystal display device.

2. Description of Related Art

With booming development of technology, consumers have higher demanding on display quality of displays. Besides demanding for specifications of resolution, contrast ratio, viewing angle, grey level inversion and color saturation of the display, the consumers have higher demanding for a response time of the display.

To meet the needs of the consumers, display practitioners devote to develop blue phase liquid crystal displays (LCDs) having a quick response characteristic. Taking a blue phase liquid crystal material as an example, a horizontal electric field is generally required to achieve a light valve function thereof. Currently, an electrode design of an in-plane switching (IPS) display module is used to drive the blue phase liquid crystal molecules in the blue phase LCD.

However, in the electrode design of a typical IPS display module, many regions above the electrode do not have the horizontal electric field, and many liquid crystal molecules in the blue phase LCD cannot be fluently driven, which may lead to low transmittance of the display module. If a driving voltage is increased in order to improve the transmittance of the IPS display module, although the transmittance is improved, power consumption is also increased. Therefore, how to resolve the problems of low transmittance and high driving voltage of the blue phase LCD is an important issue to be developed.

SUMMARY OF THE INVENTION

The invention is directed to a display device, which can avoid low transmittance and high driving voltage when blue phase liquid crystals are used in an in-plane switching (IPS) display module.

The invention provides a display device including a light source module, a display module and a guiding optical film. The light source module generates directional light. The display module is disposed above the light source module and has a vertical electric field therein. The display module includes a first substrate, a second substrate and a display medium. The first substrate has a first inner surface and a first outer surface. The second substrate is disposed opposite to the first substrate and has a second inner surface and a second outer surface, and the vertical electric field is formed between the second inner surface and the first inner surface. The display medium is disposed between the first substrate and the second substrate and is optically isotropic, where the display medium is optically anisotropic when it is driven by the vertical electric field. When the directional light enters the display module, the directional light is not perpendicular to the first outer surface, and when the directional light exits the display module, it is not perpendicular to the second outer surface. The guiding optical film is disposed on the second outer surface of the second substrate of the display module and has a light incident surface and a light emitting surface. The directional light enters the guiding optical film from the light incident surface and exits the guiding optical film through the light emitting surface to form emitting light, and an emitting direction of the emitting light and the light emitting surface has an included angle there between.

In the invention, the vertical electric field is generated between the first substrate and the second substrate to drive the display medium of the display module. Particularly, since when the directional light generated by the light source module enters the display medium, an incident direction of the directional light is not perpendicular to the first inner surface of the first substrate. When the display medium is driven to be optically anisotropic, it still has a birefringence property relative to the directional light of the light source module. According to the above descriptions, since the display device of the invention applies the vertical electric field to drive the display medium, the problems of low transmittance and high driving voltage of the conventional technique occurred when a horizontal electric filed is used to drive the blue phase liquid crystals can be avoided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic diagram of optical isotropy of a display medium under a condition of none electric field.

FIG. 2B is a schematic diagram of optical anisotropy of a display medium under an electric field.

FIG. 6A is a cross-sectional view of an optical film of a display device according to an embodiment of the invention.

FIG. 6B is a three-dimensional view of the optical film of FIG. 6A.

FIG. 9A is a cross-sectional view of a guiding optical film in a display device according to another embodiment of the invention.

FIG. 9B is a three-dimensional view of the guiding optical film of FIG. 9A.

DETAILED DESCRIPTION OF DISCLOSED EMBODIMENTS

Figure 1:
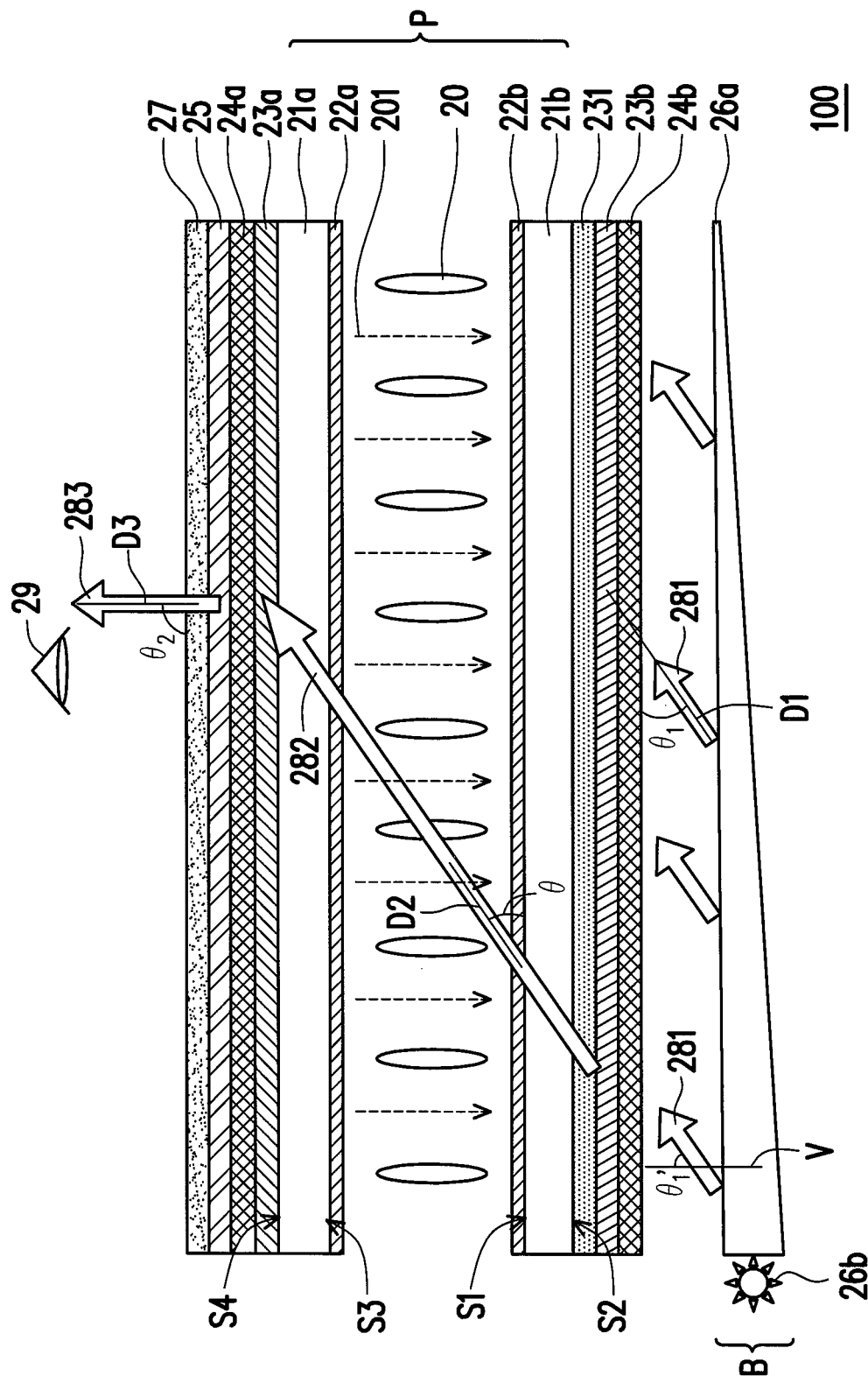
FIG. 1 is a cross-sectional view of a display device according to an embodiment of the invention.

FIG. 1 is a cross-sectional view of a display device according to an embodiment of the invention. Referring to FIG. 1, the display device 100 includes a display module P, a light source module B and a guiding optical film 25.

The display module P includes a first substrate 21b, a second substrate 21a and a display medium 20.

The first substrate 21b has an inner surface S1 and an outer surface S2, and a pixel array 22b is disposed on the inner surface S1 of the first substrate 21b. A material of the first substrate 21b can be glass, quartz, organic polymer, or other suitable materials. In the present embodiment, the pixel array 22b includes a plurality of scan lines, a plurality of data lines and a plurality of pixel units, where each of the pixel units includes an active device and a pixel electrode electrically connected to the active device, and the active device of the pixel unit is electrically connected to a corresponding data line and a corresponding scan line. The active device can be a bottom gate thin film transistor or a top gate thin film transistor.

The second substrate 21a is disposed opposite to the first substrate 21b, and the second substrate 21a has an inner surface S3 and an outer surface S4, and a counter electrode 22a is disposed on the inner surface S3 of the second substrate 21a. Similarly, a material of the second substrate 21a can be glass, quartz, organic polymer, or other suitable materials. The counter electrode 22a fully covers the inner surface S3 of the second substrate 21a. In the present embodiment, the counter electrode 22a is a transparent electrode, and a material thereof includes metal oxide such as indium tin oxide, indium zinc oxide, aluminium tin oxide, aluminium zinc oxide, indium germanium zinc oxide or other suitable metal oxides or a stacked layer of at least two of the above materials.

It should be noticed that a color filter array can be further disposed on the first substrate 21b or the second substrate 21a to achieve a color displaying effect of the display module P, though the invention is not limited thereto.

The display medium 20 is disposed between the pixel array 22b of the first substrate 21b and the counter electrode 22a of the second substrate 21a. Particularly, the display medium 20 is optically isotropic under an none electric field environment, as that shown in FIG. 2A, and the display medium 20 is optically anisotropic under an electric field 201, as that shown in FIG. 2B. In other words, when none electric field exists between the pixel array 22b and the counter electrode 22a, the display medium 20 is optically isotropic. When the vertical electric field 201 is formed between the pixel array 22b and the counter electrode 22a, the display medium 20 is optically anisotropic. In the present embodiment, the display medium 20 includes blue phase liquid crystals, which are, for example, polymer-stabilized blue phase liquid crystals or polymer-stabilized isotropic phase liquid crystals, etc. Since the display medium 20 is switched between the optical isotropy and the optical anisotropy under a function of the electric field to serve a light valve, a response speed of the display medium 20 is faster than a response speed of conventional nematic liquid crystal molecules.

The light source module B is disposed under the outer surface S2 of the first substrate 21b of the display module P, and generates directional light 281, where the directional light 281 has a specific propagating direction and a specific beam angle, and in the present embodiment, the directional light 281 is concentrated within a specific range, i.e. has directionality, which is not a light provided by a conventional scattered light source that is scattered around and has no directionality. The light source module B is, for example, an edge type light source module, and includes a light guide plate 26a and a light source 26b. Certainly, the light source module B may further include an optical film set and a frame, etc. In the present embodiment, the light source module B implemented by the edge type light source module is taken as an example for description, though the invention is not limited thereto, and in other embodiments, the light source module B can be other types of the light source module, for example, a direct type light source module.

As described above, the display medium 20 is optically anisotropic under the function of the electric field. When the vertical electric field 201 is formed between the pixel array 22b and the counter electrode 22a of the display module P, the display medium 20 presents the optical anisotropy and is vertically arranged along the vertical electric field 201 as that shown in FIG. 1 and FIG. 2A. In order to make the vertically arranged optically anisotropic display medium 20 has birefringence characteristic related to the light of the light source module B, the propagating direction of the light of the light source B is specially design, which is described as follows.

In the present embodiment, when the directional light 281 generated by the light source module B enters the display module P, it has an incident direction D1, and the incident direction D1 is not perpendicular to the outer surface S2 of the first substrate 21b. In other words, the directional light 281 generated by the light source module B is not perpendicularly incident to the display module P, but is incident to the display module P in a specific incline angle. In order to accomplish that the directional light 281 generated by the light source module B exits the light source module B with the specific incline angle, specific optical microstructures can be designed on the light guide plate 26a, or an optical film having the specific optical microstructures can be disposed on the light guide plate 26a. In this way, when the light generated by the light source 26b passes through the light guide plate 26a (or the optical film), the propagating direction of the light is changed to achieve a purpose that the directional light 281 generated by the light source module B exits the light source module B in the specific incline angle. In the present embodiment, since the directional light 281 generated by the light source module B exits the light source module B in the specific incline angle, an included angle θ1 between the incident direction D1 of the directional light 281 and the outer surface S2 of the first substrate 21b is, for example, 5 degrees~45 degrees. In other words, an incline angle θ1' of the directional light 281 generated by the light source module B is, for example, 45 degrees~85 degrees. The incline angle θ1' refers to an included angle between the incident direction D1 of the directional light 281 and a vertical axis V.

According to the above descriptions, after the directional light 281 is incident to the display module P in the incline angle θ1', it forms directional light 282, and the directional light 282 within the display module P is still propagated in a same direction to pass through the display medium 20. In other words, when the directional light 281 generated by the light source module B enters the display medium 20, it forms the directional light 282, and the directional light 282 has an incident direction D2, where the incident direction D2 is not perpendicular to the inner surface S1 of the first substrate 21b. Therefore, an included angle θ between the incident direction D2 of the directional light 282 and the inner surface S1 of the first substrate 21b is not equal to 90 degrees. In the present embodiment, the included angle θ between the incident direction D2 of the directional light 282 and the inner surface S1 of the first substrate 21b is, for example, 5 degrees~45 degrees.

Then, when the directional light 282 passes through the display medium 20 and penetrates through the second substrate 21a, it is guided by the guiding optical film 25 to form emitting light 283 having an emitting direction D3, and an included angle between the emitting direction D3 and the surface (an light emitting surface) of the guiding optical film 25 is substantially 60 degrees~420 degrees. In the present embodiment, the emitting light 283 is perpendicularly emitted from the guiding optical film 25, so that the included angle between the emitting direction D3 and the surface (the light emitting surface) of the guiding optical film 25 is substantially 90 degrees, so that the emitting light 283 received by an eye 29 of the user is a direct light. Therefore, an included angle θ2 between the emitting direction D3 of the emitting light 283 and the surface (the light emitting surface) of the guiding optical film 25 is substantially 90 degrees.

In the present embodiment, in order to maintain the same propagating direction of the directional light 281 as far as possible before it enters the display medium 20, a first optical film 24b is further disposed on the outer surface S2 of the first substrate 21b. Moreover, in order to maintain the same propagating direction of the directional light 282 as far as possible after it exits the display medium 20, a second optical film 24a is further disposed on the outer surface S4 of the second substrate 21a.

Figure 4A:
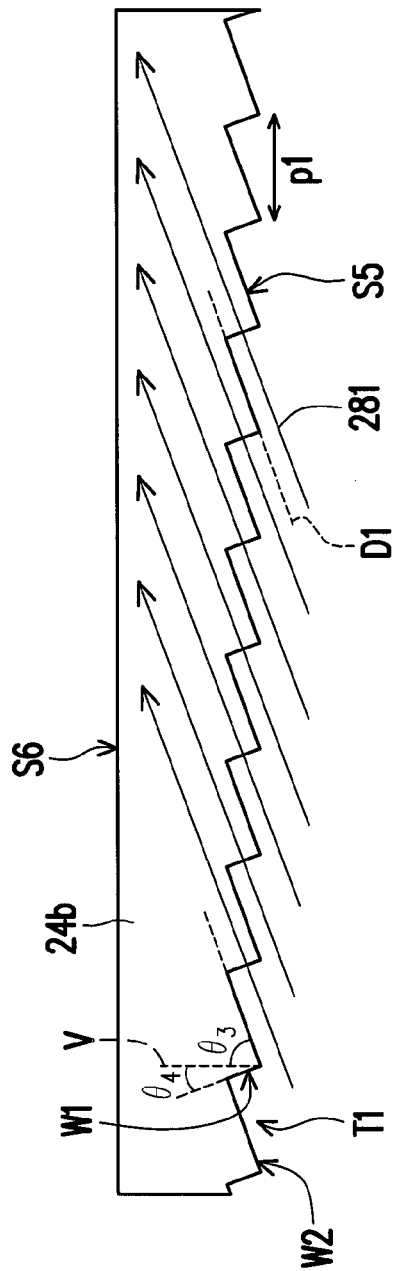
FIG. 4A is a cross-sectional view of a first optical film of a display device according to an embodiment of the invention.
Figure 4B:
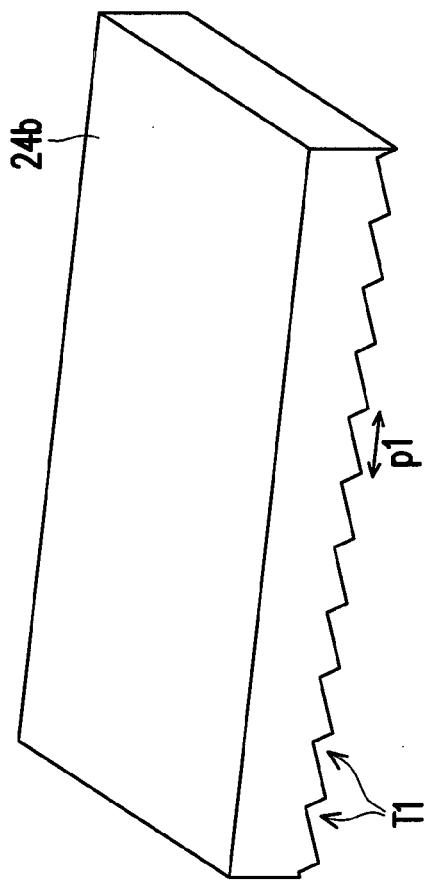
FIG. 4B is a three-dimensional view of the first optical film of FIG. 4A.

Referring to FIG. 1 and FIG. 4A and FIG. 4B, the first optical film 24b is disposed on the outer surface S2 of the first substrate 21b. Particularly, the first optical film 24b has a plurality of first optical structures T1, and based on the first optical structures T1, total reflection is substantially not produced when the directional light 281 passes there through, namely, the directional light 281 directly passes through the first optical structures T1 of the first optical film 24b. When the directional light 281 directly passes through the first optical structures T1 of the first optical film 24b without producing total reflection or other refractions, depletion of the directional light 281 passing through the first optical film 24b can be minimized, namely, depletion of the directional light 281 at an interface of the air and the first substrate 21b due to reflection is avoided. In this way, the directional light 281 can pass through the first optical film 24b in a same propagating direction as far as possible.

In the present embodiment, the first optical film 24b has a first surface S5 and a second surface S6 opposite to the first surface S5. The first surface S5 faces to the light source module B, the second surface S6 faces to the outer surface S2 of the first substrate 21b, and the first optical structures T1 are located on the first surface S5. In other words, the second surface S6 of the first optical film 24b is a flat plane, though the invention is not limited thereto. Moreover, the first optical structures T1 on the first surface S5 of the first optical film 24b ensure that the directional light 281 of the light source module B directly passes through the first optical film 24b as far as possible.

In the present embodiment, each of the first optical structures T1 is a groove structure having a first sidewall W1 and a second sidewall W2 as that shown in FIG. 4A. The incident direction D1 of the directional light 281 passing through the first optical film 24b is substantially perpendicular to the first sidewall W1, and the incident direction D1 is substantially parallel to the second sidewall W2. In detail, in the first optical structure (the groove structure) T1 of the present embodiment, the first sidewall W1 is a short sidewall and the second sidewall W2 is a long sidewall, and the short sidewall W1 is substantially perpendicular to the incident direction D1 of the directional light 281. Moreover, a refractive index of the first optical film 24b is close to a refractive index of the first substrate 21b. In this way, when the directional light 281 passes through the first optical structure (the groove structure) T1, the directional light 281 can directly penetrate through the short sidewall W1 without producing total reflection or refraction, so that the directional light 281 can directly pass through the first optical film 24b as far as possible. In the present embodiment, a size P1 of the first optical structure (the groove structure) T1 is about 5 mm~100 μm. An included angle θ4 between the first sidewall W1 of the first optical structure (the groove structure) T1 and the vertical axis V is about 5 degrees~45 degrees. An included angle θ3 between the second sidewall W2 of the first optical structure (the groove structure) T1 and the vertical axis V is about 45 degrees~85 degrees.

Figure 5A:
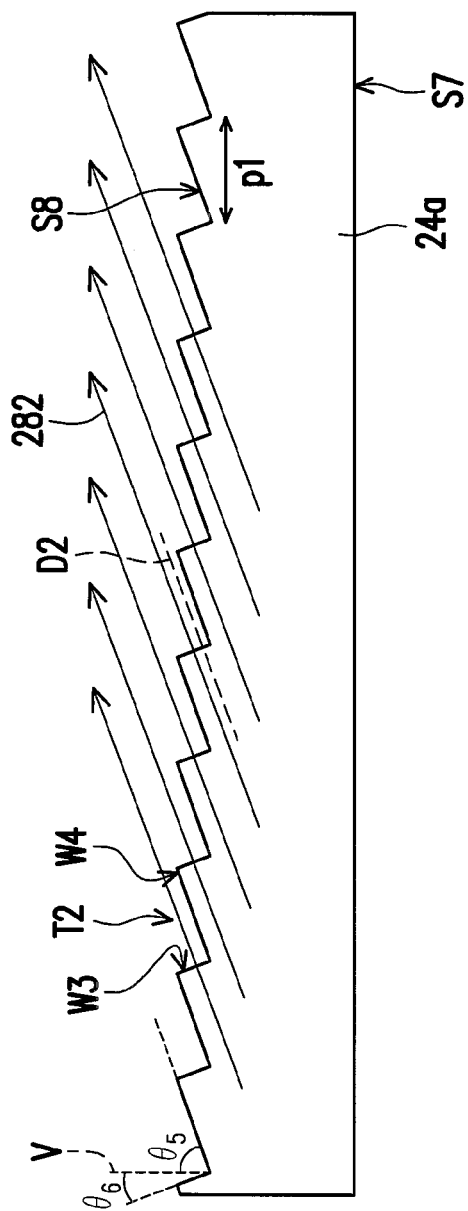
FIG. 5A is a cross-sectional view of a second optical film of a display device according to an embodiment of the invention.
Figure 5B:
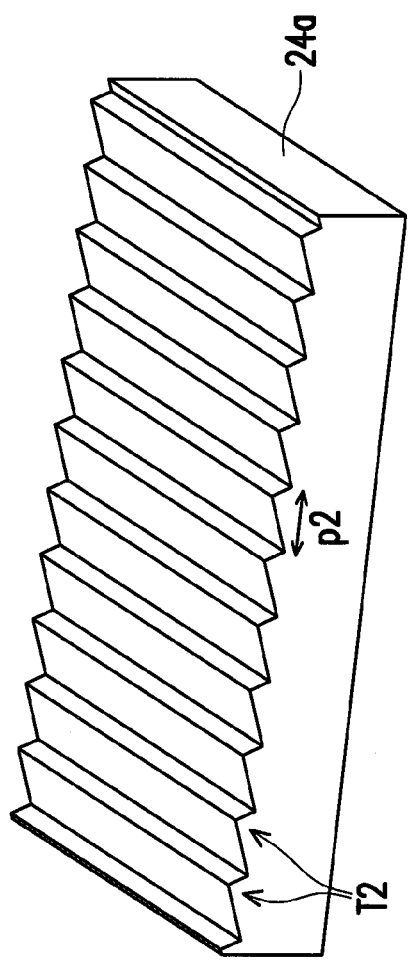
FIG. 5B is a three-dimensional view of the second optical film of FIG. 5A.

Then, referring to FIG. 1, FIG. 5A and FIG. 5B, the second optical film 24a is disposed on the outer surface S4 of the second substrate 21a. Particularly, the second optical film 24a has a plurality of second optical structures T2, and based on the second optical structures T2, the total reflection is substantially not produced when the directional light 282 passes there, namely, the directional light 282 directly passes through the second optical structures T2 of the second optical film 24a. When the directional light 282 directly passes through the second optical structures T2 of the second optical film 24a without producing total reflection or other refractions, depletion of the directional light 282 passing through the second optical film 24a can be minimized, namely, depletion of the directional light 282 at an interface of the air and the second substrate 21a due to reflection is avoided. In this way, the directional light 282 can pass through the second optical film 24a in a same propagating direction as far as possible.

In the present embodiment, the second optical film 24a has a first surface S7 and a second surface S8 opposite to the first surface S7. The first surface S7 faces to the outer surface S4 of the second substrate 21a, and the second optical structures T2 are located on the second surface S8. In other words, the first surface S7 of the second optical film 24a is a flat plane, though the invention is not limited thereto. Moreover, the second optical structures T2 on the second surface S8 of the second optical film 24a ensure that the directional light 282 directly passes through the second optical film 24a as far as possible.

In the present embodiment, each of the second optical structures T2 is a groove structure having a first sidewall W3 and a second sidewall W4 as that shown in FIG. 5A. The incident direction D2 of the directional light 282 passing through the second optical film 24a is substantially perpendicular to the first sidewall W3, and the incident direction D2 is substantially parallel to the second sidewall W4. In detail, in the second optical structure (the groove structure) T2 of the present embodiment, the first sidewall W3 is a short sidewall and the second sidewall W4 is a long sidewall, and the short sidewall W3 is substantially perpendicular to the incident direction D2 of the directional light 282. Moreover, a refractive index of the second optical film 24a is close to a refractive index of the second substrate 21a. In this way, when the directional light 282 passes through the second optical structure (the groove structure) T2, the directional light 282 can directly penetrate through the short sidewall W3 without producing total reflection or refraction, so that the directional light 282 can directly pass through the second optical film 24a as far as possible. In the present embodiment, a size P2 of the second optical structure (the groove structure) T2 is about 5 μm~100 μm. An included angle θ6 between the first sidewall W3 of the second optical structure (the groove structure) T2 and the vertical axis V is about 5 degrees~45 degrees. An included angle θ5 between the second sidewall W4 of the second optical structure (the groove structure) T2 and the vertical axis V is about 45 degrees~85 degrees.

Then, referring to FIG. 1 and FIG. 6A and FIG. 6B, the guiding optical film 25 is disposed on the second optical film 24a. The guiding optical film 25 has a plurality of guiding optical structures T3, and the directional light 282 is totally reflected by the guiding optical structures T3 to form the emitting light 283, so that an included angle between the emitting direction D3 of the emitting light 283 passing through the guiding optical film 25 and the surface (the light emitting surface) S10 of the guiding optical film 25 is 60~120 degrees. In the present embodiment, the emitting direction D3 of the emitting light 283 passing through the guiding optical film 25 is substantially perpendicular to the surface (the light emitting surface) S10 of the guiding optical film 25. In other words, the directional light 282 is totally reflected by the guiding optical structures T3 of the guiding optical film 25 as far as possible to form the emitting light 283. In other words, the guiding optical structures T3 of the guiding optical film 25 are mainly used to collimate the propagating direction of the directional lights 281 and 282 come from the light source module B. Therefore, the emitting light 283 can vertically exit the guiding optical film 25 to facilitate reception of the user's eye 29.

In the present embodiment, the guiding optical film 25 has a first surface S9 (which is also referred to as an light incident surface) and a second surface S10 (which is also referred to as an light emitting surface) opposite to the first surface S9, the first surface S9 faces to the outer surface S4 of the second substrate 21a, and the guiding optical structures T3 are located on the first surface S9. In other words, the second surface S10 of the guiding optical film 25 is a flat plane, though the invention is not limited thereto. The guiding optical structures T3 on the first surface S9 of the guiding optical film 25 ensure that the directional light 282 is totally reflected as far as possible to form the emitting light 283.

In the present embodiment, each of the guiding optical structures T3 is a groove structure having a first sidewall W5 and a second sidewall W6 as that shown in FIG. 6A. In the present embodiment, the first sidewall W5 and the second sidewall W6 of the groove structure T3 are all flat sidewalls. In detail, in the guiding optical structure (the groove structure) T3 of the present embodiment, an included angle θ7 between the first sidewall W5 and the vertical axis V is about 5 degrees~60 degrees, and an included angle θ8 between the second sidewall W6 and the vertical axis V is about 15 degrees~45 degrees. Therefore, when the directional light 282 enters the guiding optical film 25, the directional light 282 can be totally reflected by the first sidewall W5 of the guiding optical structure T3 to form the emitting light 283, and the emitting light 283 can vertically exit the guiding optical film 25. Moreover, in the present embodiment, a size P3 of the guiding optical structure (the groove structure) T3 is about 5 μm~100 μm.

Figure 7:
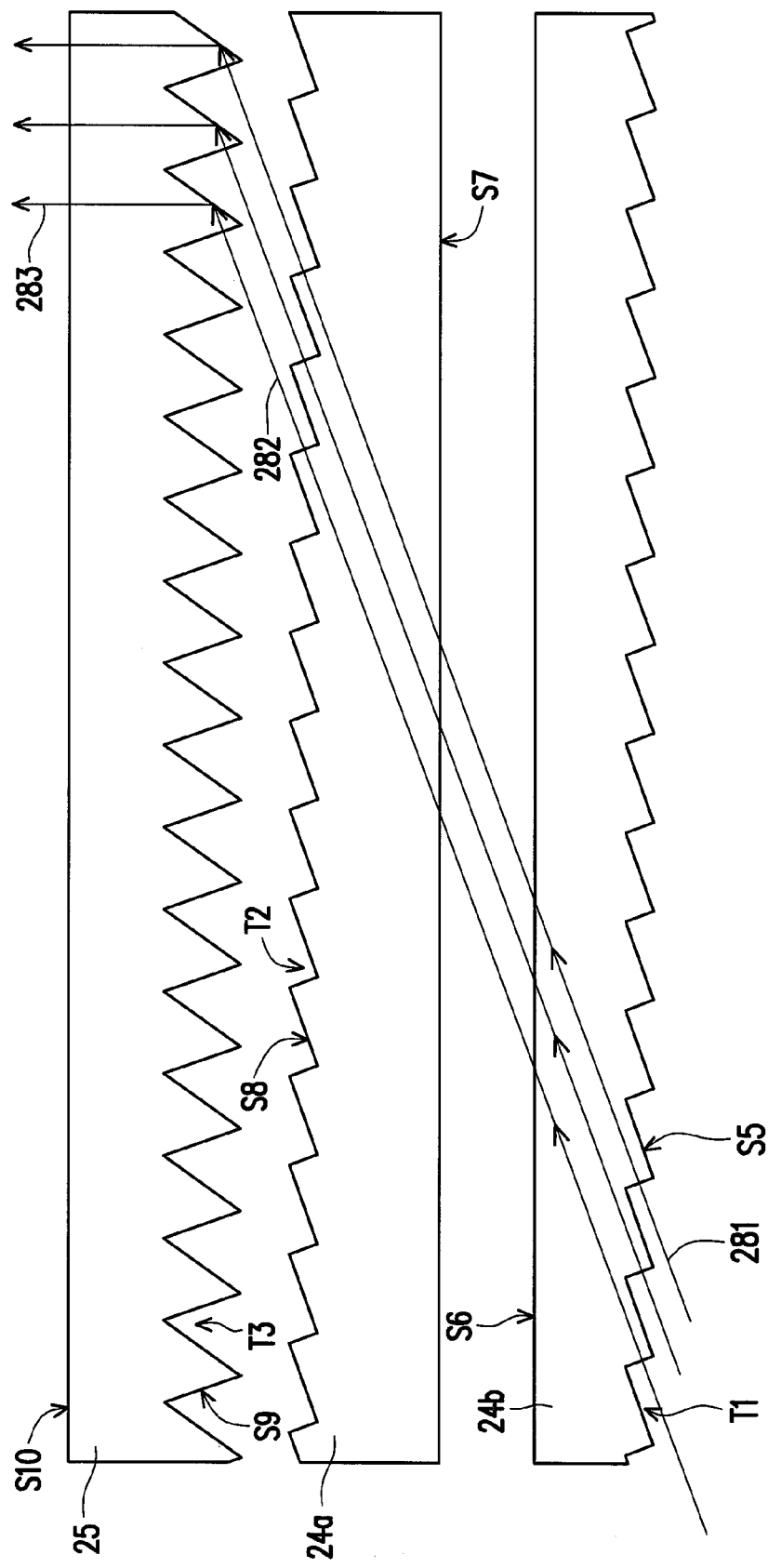
FIG. 7 is a diagram illustrating an optical path of a light passing through a first optical film, a second optical film and an optical film according to an embodiment of the invention.

FIG. 7 is a diagram illustrating an optical path of the directional lights 281 and 282 of the light source module B passing through the first optical film 24b, the second optical film 24a and the guiding optical film 25 to form the emitting light 283. In order to clearly illustrate the optical paths of the directional light 281, the directional light 283 and the emitting light 283 respectively passing through the first optical film 24b, the second optical film 24a and the guiding optical film 25, only the first optical film 24b, the second optical film 24a and the guiding optical film 25 are illustrated in FIG. 7, and the display module P and the other film layers are omitted.

As shown in FIG. 7, when the directional light 281 passes through the first optical film 24b, it directly passes there through as far as possible without producing total reflection or refraction. Then, when the directional light 282 passes through the second optical film 24a, it directly passes there through as far as possible without producing total reflection or refraction. Then, the directional light 282 is totally reflected by the guiding optical structures T3 of the guiding optical film 25 as far as possible to form the emitting light 283. By applying the first optical film 24b, the second optical film 24a and the guiding optical film 25, the light of the light source module B obliquely incident to the display module P can exit the guiding optical film 25 in a forward direction.

Referring to FIG. 1, besides the display module P, the light source module B and the guiding optical film 25, the display device 100 of the present embodiment further includes a lower polarizer 23b and an upper polarizer 23a. The lower polarizer 23b is disposed between the first substrate 21b and the first optical film 24b, and the upper polarizer 23a is disposed between the second substrate 21a and the second optical film 24a. The lower polarizer 23b and the upper polarizer 23a can be dichroic polymer films, which are, for example, polyvinyl-alcohol-based films. An angle between a transmission axis of the lower polarizer 23b and a transmission axis of the upper polarizer 23a can be 5 degrees to 175 degrees.

Moreover, to achieve a better display quality of the display module P, the display module P of the present embodiment may further include a compensation film 231 and a diffuser 27. The compensation film 231 is disposed between the lower polarizer 23b and the upper polarizer 23a. In the present embodiment, the compensation film 231 is disposed between the lower polarizer 23b and the first substrate 21b. According to another embodiment, the compensation film (not shown) can also be disposed between the upper polarizer 23a and the second substrate 21a, or the compensation film 231 is disposed between the lower polarizer 23b and the first substrate 21b, and the compensation film (not shown) can be disposed between the upper polarizer 23a and the second substrate 21a. Utilization of the compensation film 231 may increase contrast performance of the display module P and enlarge a viewing angle of the display module P. Moreover, the diffuser 27 is disposed above the upper polarizer 23a to diffuse the emitting light 283, so as to achieve better display quality of the display module. However, the invention is not limited to use the diffuser 27 and the compensation film 231. In other embodiments, both of or one of the diffuser 27 and the compensation film 231 can be omitted.

Since the display medium 20 of the display module P is driven by the vertical electric field 201 between the pixel array 22b and the counter electrode 22a, the problems of low transmittance and high driving voltage occurred in a conventional in-plane switching (IPS) display module when a horizontal electric field is used to drive blue phase liquid crystals can be avoided. Moreover, since the incident direction D2 of the directional light 281 and the directional light 282 entering the display medium 20 and generated by the light source module B is not perpendicular to the surface of the first substrate 21b, when the display medium 20 is driven to be optically anisotropic, it still has a birefringence property relative to the directional light 282 of the light source module B, so that the display module P can display images.

Figure 3A:
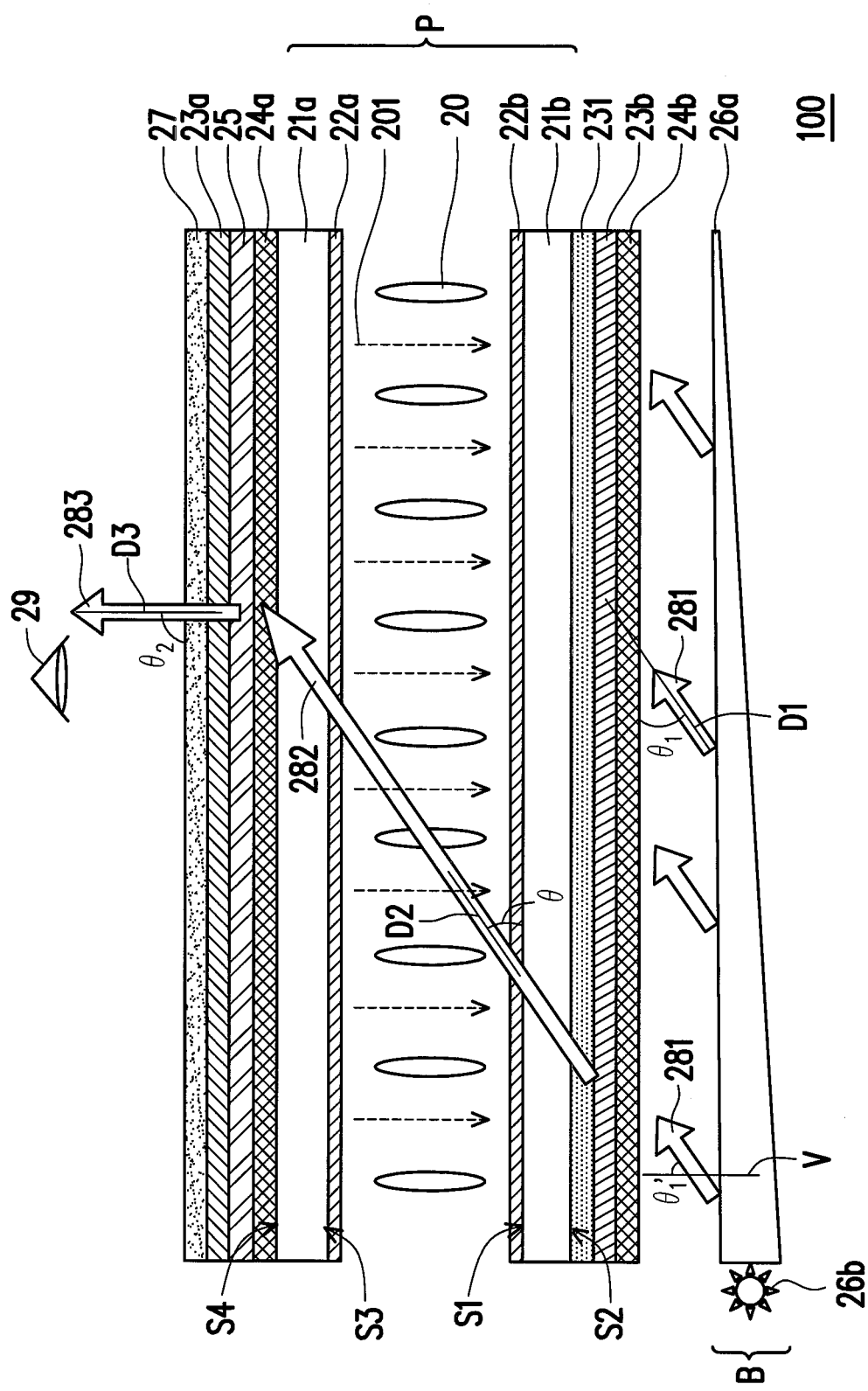
FIG. 3A and FIG. 3B are cross-sectional views of a display device according to an embodiment of the invention.

In the embodiment of FIG. 1, the upper polarizer 23a is disposed between the second substrate 21a and the second optical film 24a. In this way, a polarizing state of the directional light 282 is less influenced by the second optical film 24a and the guiding optical film 25. However, the invention is not limited thereto. In other embodiments, the upper polarizer 23a can also be disposed above the second optical film 24a or the guiding optical film 25, as that shown in FIG. 3A.

Figure 3B:
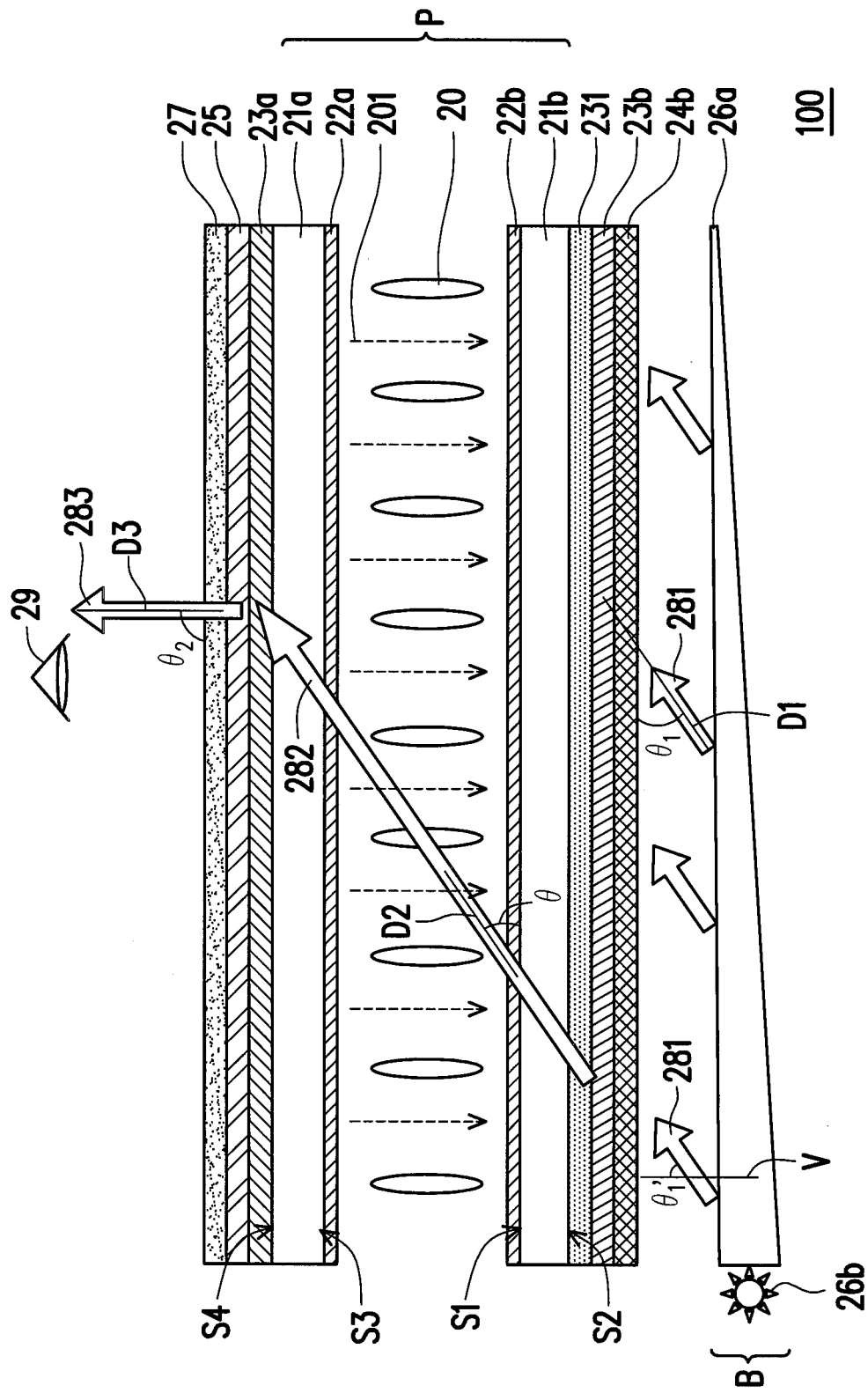

Moreover, in another embodiment, the second optical film 24b of the display module P can also be omitted as that shown in FIG. 3B. In this way, the polarizing state of the directional light 282 is less influenced by the second optical film 24a, though the invention is not limited thereto.

Moreover, in the embodiment of FIG. 1, the guiding optical film 25 of the display module P has the structure as that shown in FIG. 6A and FIG. 6B. However, the invention is not limited thereto, and in other embodiments, the guiding optical film 25 of the display device 100 can also apply other types of structure, which is described as follows.

Figure 8A:
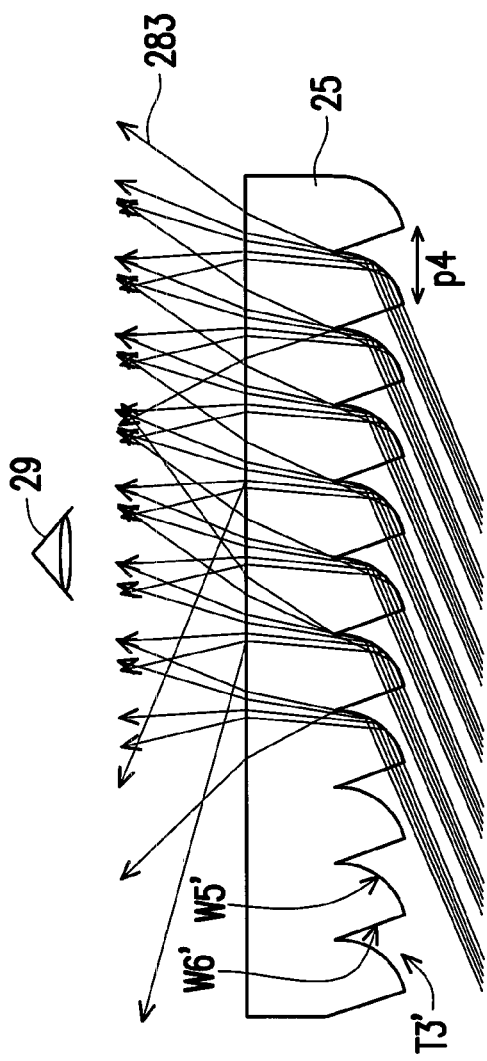
FIG. 8A is a cross-sectional view of a guiding optical film in a display device according to another embodiment of the invention.
Figure 8B:
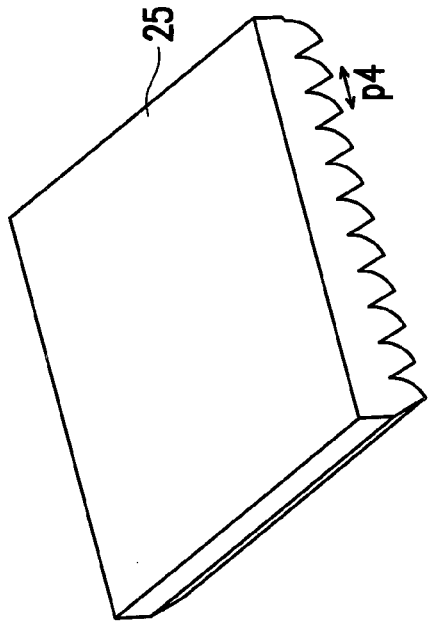
FIG. 8B is a three-dimensional view of the guiding optical film of FIG. 8A.

FIG. 8A is a cross-sectional view of a guiding optical film in a display device according to another embodiment of the invention. FIG. 8B is a three-dimensional view of the guiding optical film of FIG. 8A. Referring to FIG. 8A and FIG. 8B, guiding optical structures T3' of the guiding optical film 25 of the present embodiment are groove structures, and a first sidewall W5' of the guiding optical structure (the groove structure) T3' is a curved sidewall, and a second sidewall W6' of the guiding optical structure (the groove structure) T3' is a flat sidewall. Therefore, when the directional light 282 is incident to the guiding optical film 25, the directional light 282 is totally reflected by the first sidewall (the curved sidewall) W5' of the guiding optical structure T3' to form the emitting light 283, and the emitting light 283 can vertically exit the guiding optical film 25. Particularly, since the first sidewall W5' is the curved sidewall, the directional light 282 is totally reflected by the first sidewall (the curved sidewall) W5' to form the emitting light 283. In addition, a part of the emitting light 283 is also reflected to the first sidewall (the curved sidewall) W5' and exits the guiding optical film 25 by refraction due to that an incident angle thereof is smaller than a total reflection angle. Therefore, when the first sidewalls W5' of the guiding optical structure (the groove structure) T3' are curved sidewalls, an included angle between an emitting direction of the emitting light 283 and the light emitting surface is 60 degrees~120 degrees, i.e. the emitting light 283 can be scattered to achieved better image quality. Similarly, in the present embodiment, a size P4 of the guiding optical structure (the groove structure) T3' is about 5 μm~100 μm.

In the embodiment of FIG. 8A and FIG. 8B, radius of curvatures of the curved sidewalls W5' of all of the guiding optical structures T3' of the guiding optical film 25 are the same, so that the guiding optical structures T3' of the guiding optical film 25 of the embodiment of FIG. 8A and FIG. 8B have the same groove pattern. However, the invention is not limited thereto, and in other embodiments, the guiding optical structures of the guiding optical film 25 may have different patterns, as that shown in FIG. 9A and FIG. 9B.

FIG. 9A is a cross-sectional view of a guiding optical film in a display device according to another embodiment of the invention. FIG. 9B is a three-dimensional view of the guiding optical film of FIG. 9A. Referring to FIG. 9A and FIG. 9B, in the present embodiment, each of the guiding optical structures T3' of the guiding optical film 25 has a flat sidewall and a curved sidewall, though radius of curvatures of the curved sidewalls of the guiding optical structures T3' are different. For example, a radius of curvature of a curved sidewall W5' of the guiding optical structure T3' is different to a radius of curvature of a curved sidewall W5", and the guiding optical structure T3' having the curved sidewall W5' with relatively large radius of curvature and the guiding optical structure T3' having the curved sidewall W5" with relatively small radius of curvature are alternately arranged.

Figure 10A:
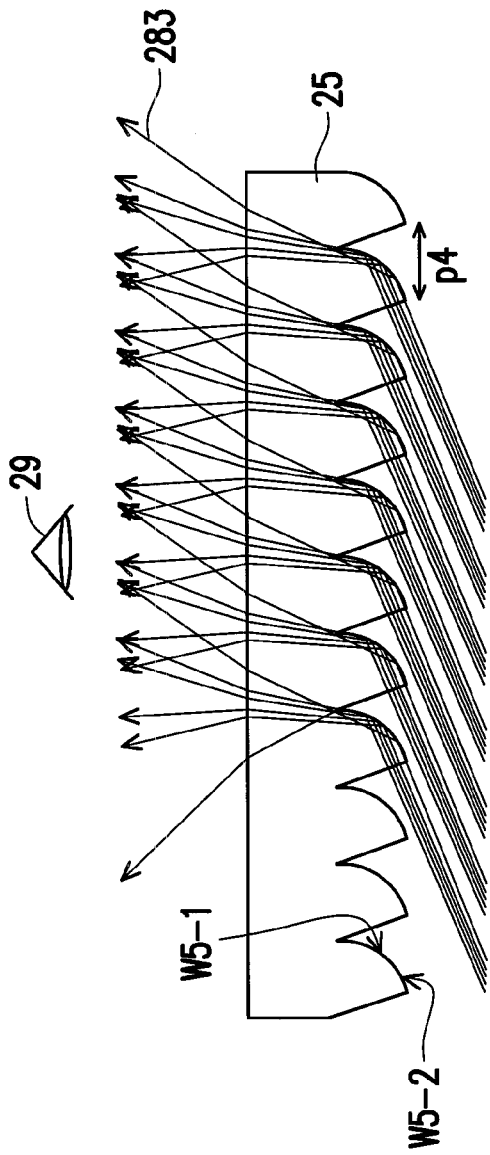
FIG. 10A is a cross-sectional view of a guiding optical film in a display device according to another embodiment of the invention.
Figure 10B:
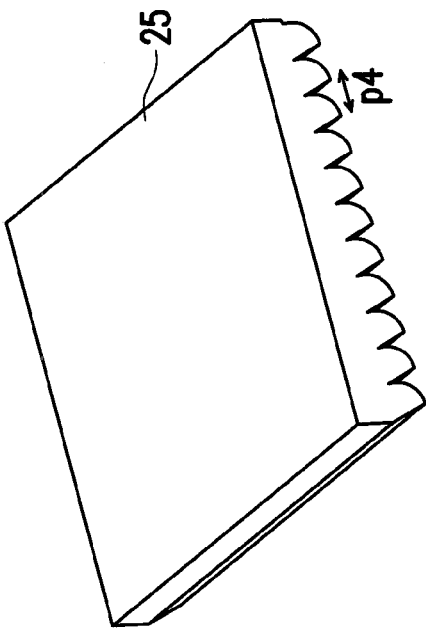
FIG. 10B is a three-dimensional view of the guiding optical film of FIG. 10A.

FIG. 10A is a cross-sectional view of a guiding optical film in a display device according to another embodiment of the invention. FIG. 10B is a three-dimensional view of the guiding optical film of FIG. 10A. Referring to FIG. 10A and FIG. 10B, in the present embodiment, each of the guiding optical structures T3' of the guiding optical film 25 has a flat sidewall and a curved sidewall, and the curved sidewall of each of the guiding optical structures T3' has a plurality of radius of curvatures, and the radius of curvature of the curved sidewall closer to the bottom of the groove structure T3' is smaller. For example, a first sidewall of the groove structure T3' of the guiding optical film 25 is the curved sidewall, which includes a curved sidewall W5-1 and a curved sidewall W5-2, and a radius of curvature of the curved sidewall W5-1 is smaller than a radius of curvature of the curved sidewall W5-2. Here, for clarity's sake, two curved sidewalls W5-1 and W5-2 with different radius of curvatures are taken as an example, for description, though the first sidewall of the groove structure T3' of the guiding optical film 25 is actually a continuous curved surface.

As described above, when the directional light 282 is incident to the guiding optical film 25, the directional light 282 is totally reflected by the curved sidewalls W5-1 and W5-2 to form the emitting light 283. Besides, a part of the emitting light 283 is further reflected to the curved sidewall W5-1 and exits the guiding optical film 25 by refraction. Since the radius of curvature of the curved sidewall W5-1 closer to the bottom of the groove structure T3' is smaller, an included angle between a tangent of the curved sidewall W5-1 and a propagating direction of the emitting light 283 is smaller, and when the emitting light 283 is reflected thereto, it is easily to be refracted and to exit the guiding optical film. In other words, more emitting light 283 can be refracted at the curved sidewall W5-1 with relatively small radius of curvature to exit the guiding optical film 25. In other words, a light divergent angle and light distribution of the guiding optical film 25 of FIG. 10A and FIG. 10B is larger and wider than that of the embodiment of FIG. 8A and FIG. 8B.

Figure 11:
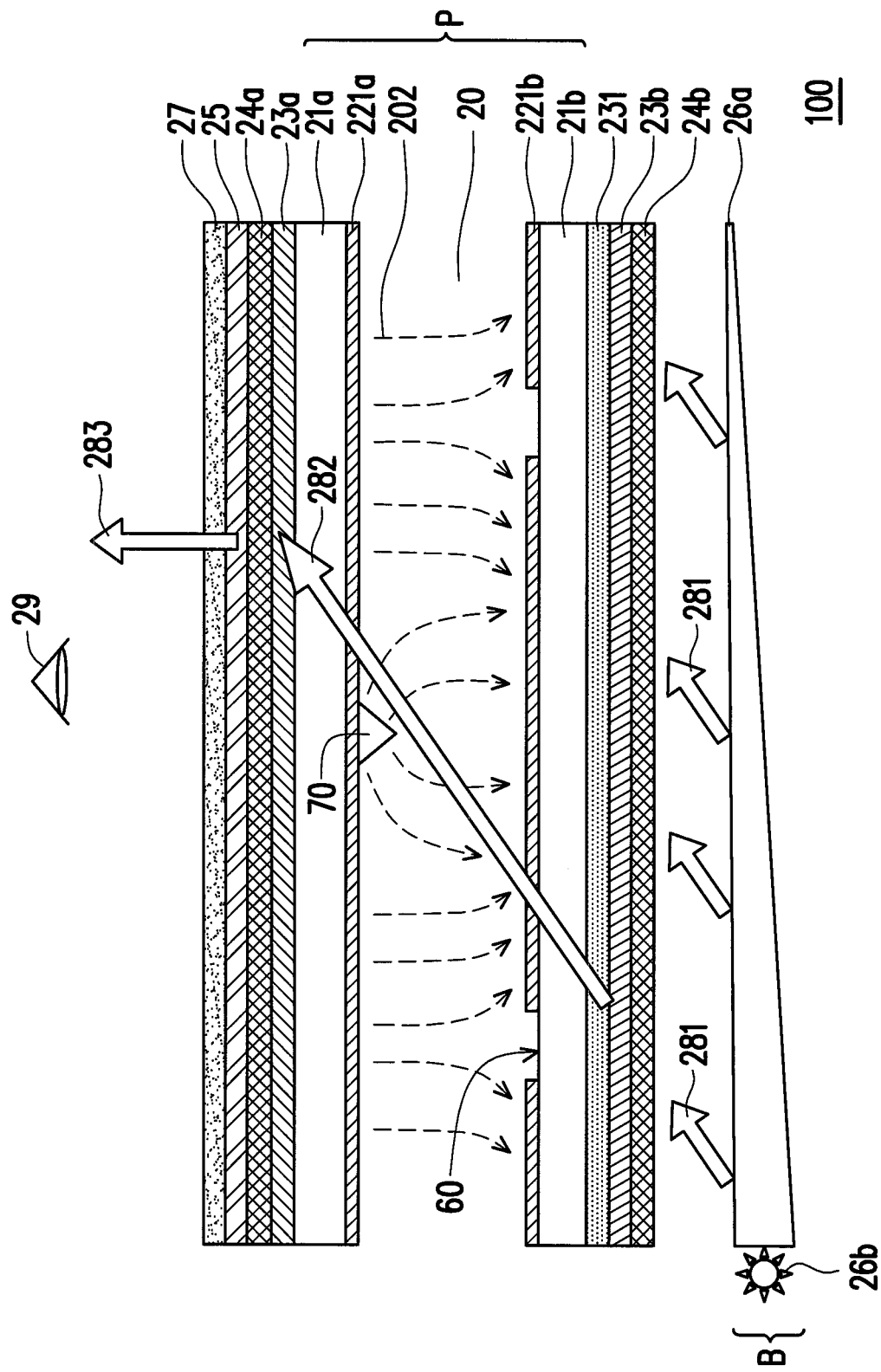
FIG. 11 and FIG. 12 are cross-sectional views of display devices according to embodiments of the invention.
Figure 12:
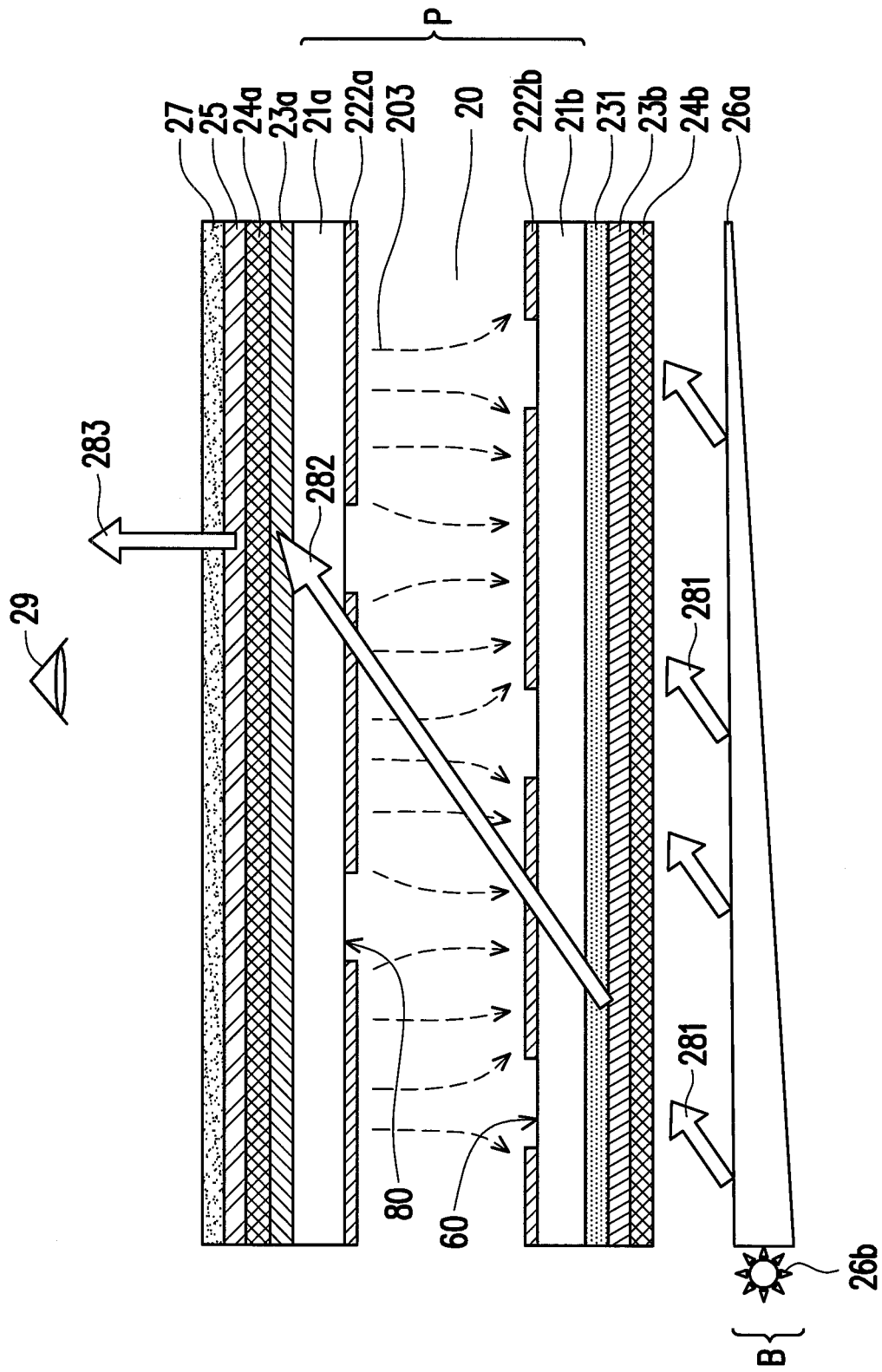

FIG. 11 and FIG. 12 are cross-sectional views of display devices according to embodiments of the invention. The embodiments of FIG. 11 and FIG. 12 are similar to the embodiment of FIG. 1, so that the same devices are represented by the same symbols, and descriptions thereof are not repeated. A difference between the embodiment of FIG. 11 and the embodiment of FIG. 1 is that a pixel array 221b further comprises an alignment slit pattern 60, and an alignment protrusion pattern 70 is further configured on the counter electrode 221a. By configuring the alignment slit pattern 60 to the pixel array 221b and configuring the alignment protrusion pattern 70 to the counter electrode 221a, distribution of the vertical electric field 202 is changed, so as to achieve a multi-domain alignment effect of the display medium 20. Similarly, a difference between the embodiment of FIG. 12 and the embodiment of FIG. 1 is that the pixel array 221b has the alignment slit pattern 60, and the counter electrode 221a has an alignment slit pattern 80. By configuring the alignment slit pattern 60 to the pixel array 221b and configuring the alignment slit pattern 80 to the counter electrode 221a, distribution of the vertical electric field 202 is changed, so as to achieve the multi-domain alignment effect of the display medium 20.

In the embodiments of FIG. 11 and FIG. 12, the alignment patterns (for example, the alignment slit pattern or the alignment protrusion pattern) are configured to the pixel array 221b and the counter electrode 221a, though the invention is not limited thereto. In other embodiments, the alignment pattern (for example, the alignment slit pattern or the alignment protrusion pattern) can be only configured to the pixel array 221b, or the alignment pattern (for example, the alignment slit pattern or the alignment protrusion pattern) can be only configured to the counter electrode 221a. Moreover, a combination of the alignment patterns configured to the pixel array 221b and the counter electrode 221a is not limited to the embodiments of FIG. 11 and FIG. 12. In other words, the alignment protrusion pattern can be configured to the pixel array 221b and the alignment slit pattern is configured to the counter electrode 221a, or the alignment protrusion pattern can be configured to the pixel array 221b and the alignment protrusion pattern is also configured to the counter electrode 221a.

The display device of the invention has relatively low driving voltage and better transmittance compared to the conventional IPS display device, and several embodiments are provided below for comparison.

Driving Voltage Comparison I

Figure 13:
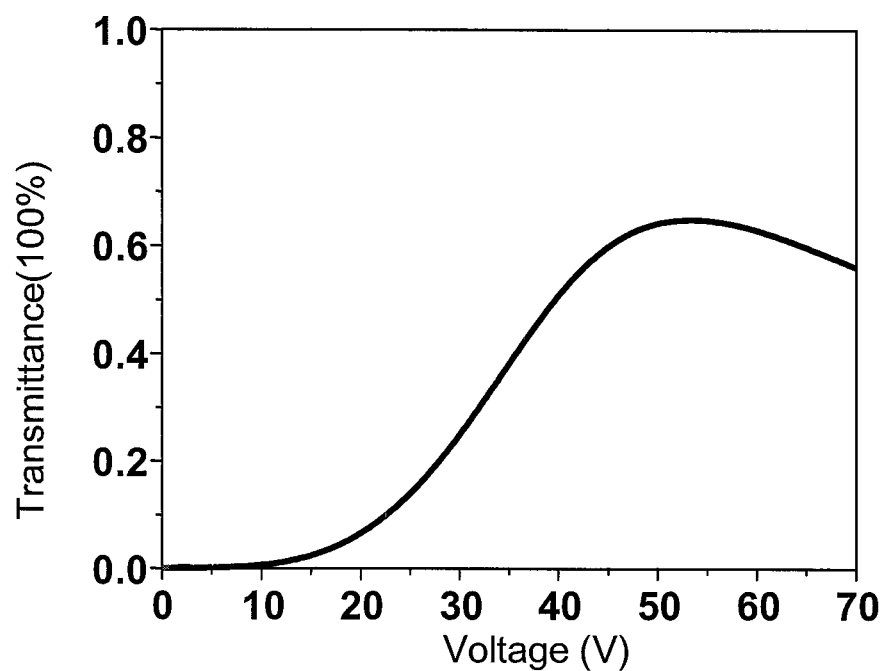
FIG. 13 is a relationship diagram of voltages and transmittances of blue phase liquid crystals driven by a horizontal electric filed of a conventional IPS display module.

FIG. 13 is a relationship diagram of voltages and transmittances of blue phase liquid crystals driven by a horizontal electric filed of the conventional IPS display module. Referring to FIG. 13, a horizontal axis of FIG. 13 represents voltages (V), and a vertical axis represents transmittances of the display module. According to FIG. 13, it is known that when the conventional IPS display module is used to drive the blue phase liquid crystals, a driving voltage thereof is required to be 52V in order to achieve a better transmittance. Namely, when the driving voltage reaches 52V, the display module has a Kerr constant of 12.68 nm/V$^2$.

Figure 14A:
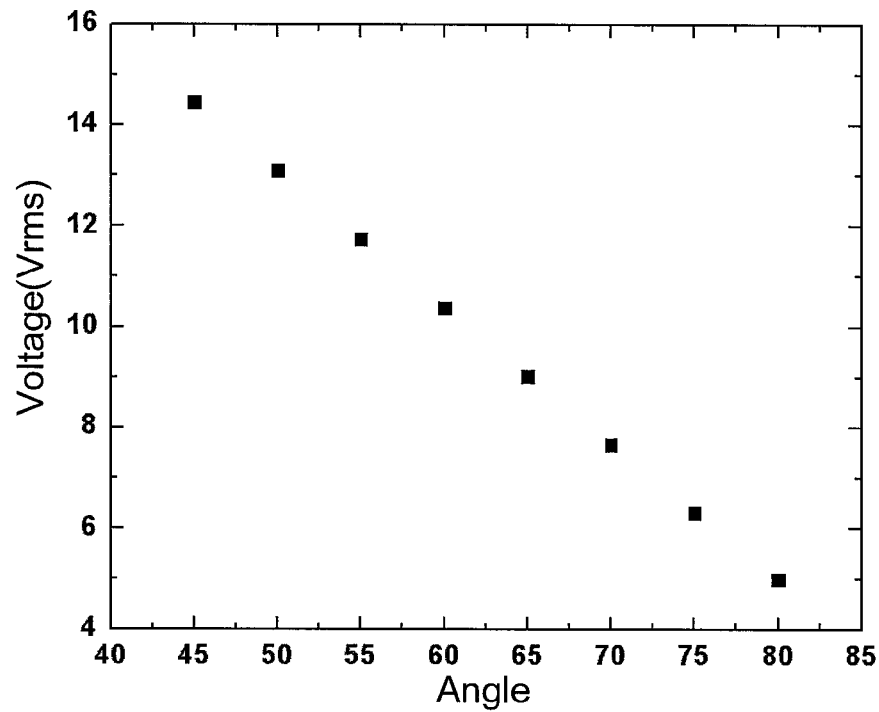
FIG. 14A and FIG. 14B are relationship diagrams of voltages and light angles of blue phase liquid crystals driven by a vertical electric filed of a display device of the invention.
Figure 14B:
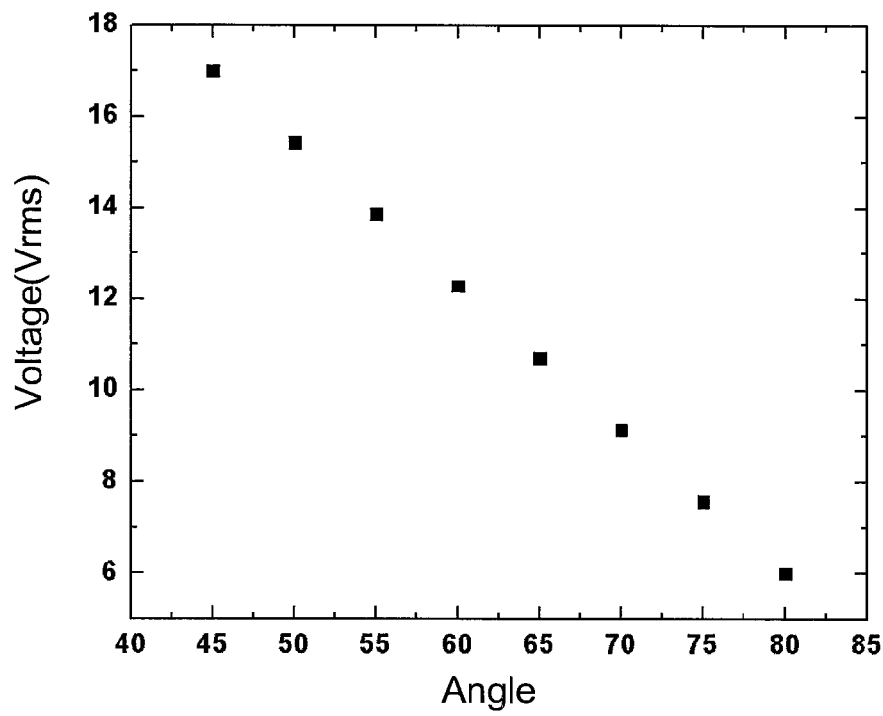

FIG. 14A and FIG. 14B are relationship diagrams of voltages and light angles of blue phase liquid crystals driven by a vertical electric filed of the display device of the invention. A horizontal axis of FIG. 14A or FIG. 11B represents incline angles (i.e. the angle θ1' of FIG. 1) of the light of the light source module, and a vertical axis represents transmittances of the display module.

Referring to FIG. 14A, a thickness (which is also referred to as a cell gap) of the display medium of the display module of the display device is 3.5 μm, and the display module of FIG. 14A has the Kerr constant of 12.68 nm/V$^2$. According to FIG. 14A, it is known that the driving voltage (below 15V) required by the display module of FIG. 14A is far lower than the driving voltage (52V) of the IPS display module of FIG. 13. Moreover, in the display device of FIG. 14A, as the incline angle of the light of the light source module increases, the corresponding driving voltage decreases.

Referring to FIG. 14B, a thickness (the cell gap) of the display medium of the display module of the display device is 5 μm, and the display module of FIG. 14B also has the Kerr constant of 12.68 nm/V$^2$. According to FIG. 14B, it is known that the driving voltage (below 18V) required by the display module of FIG. 14B is still far lower than the driving voltage (52V) of the IPS display module of FIG. 13. Similarly, in the display device of FIG. 14B, as the incline angle of the light of the light source module increases, the corresponding driving voltage decreases.

Driving Voltage Comparison II

Figure 15:
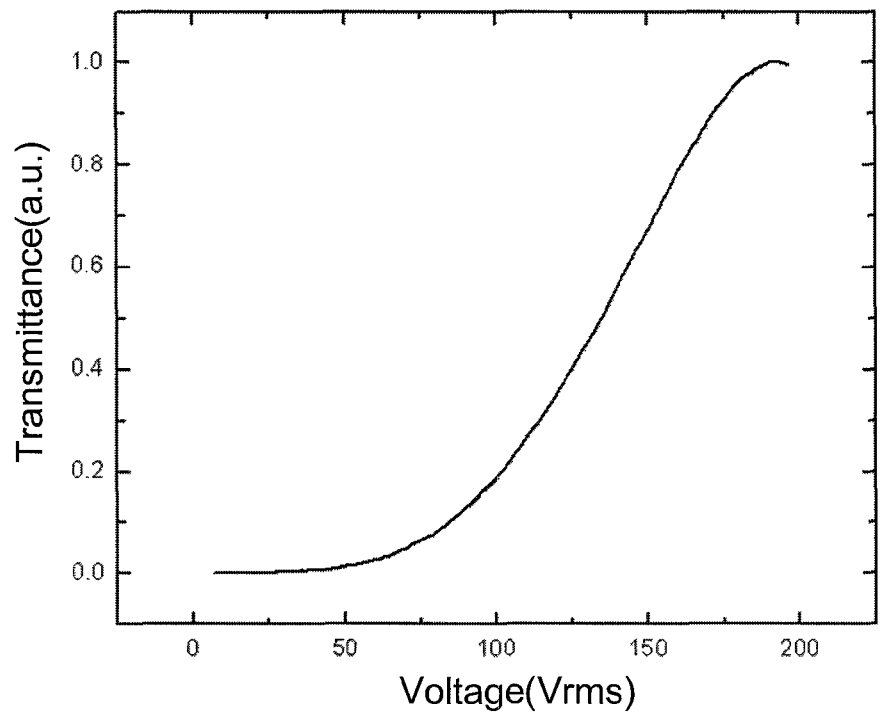
FIG. 15 is a relationship diagram of voltages and transmittances of blue phase liquid crystals driven by a horizontal electric filed of the conventional IPS display module.

FIG. 15 is a relationship diagram of voltages and transmittances of blue phase liquid crystals driven by a horizontal electric filed of the conventional IPS display module. Referring to FIG. 15, a horizontal axis of FIG. 15 represents voltages (V), and a vertical axis represents transmittances of the display module. In FIG. 15, a laser light of 633 nm is used to serve as the light of the light source module, and the laser light enters the IPS display module in a vertical direction. According to FIG. 15, it is known that when the driving voltage reaches 193 Vrms, the display module has a maximum transmittance.

Figure 16:
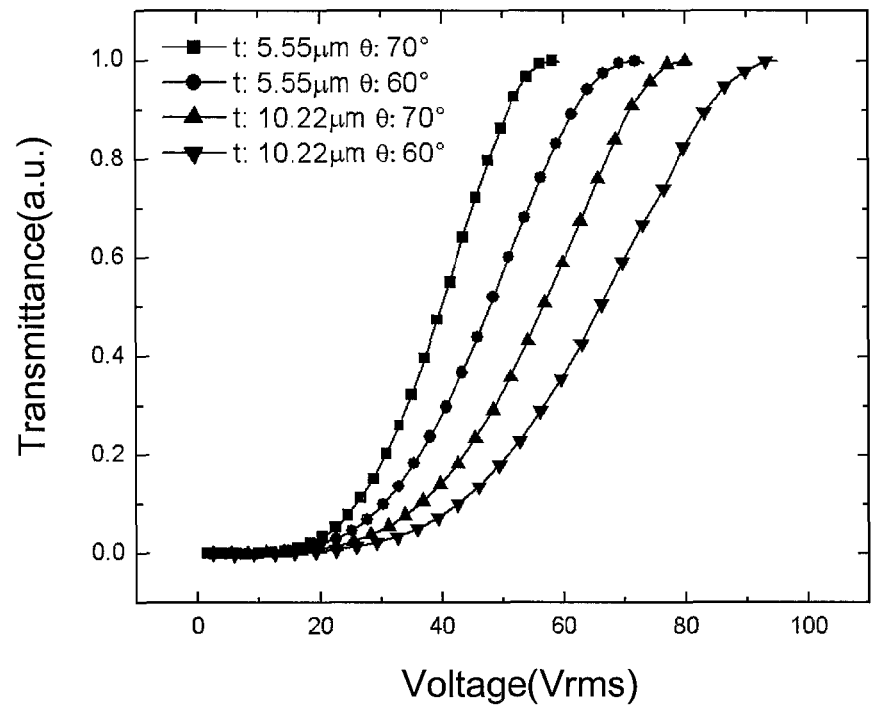
FIG. 16 is a relationship diagram of voltages and transmittances of blue phase liquid crystals driven by a vertical electric filed of a display device of the invention.

FIG. 16 is a relationship diagram of voltages and transmittances of blue phase liquid crystals driven by a vertical electric filed of the display device of the invention. Referring to FIG. 16, a horizontal axis of FIG. 16 represents voltages (V), and a vertical axis represents transmittances of the display module. In FIG. 16, the laser light of 633 nm serves as the light of the light source module, t represents a thickness (the cell gap) of the display medium, and θ represents an incline angle (i.e. the angle θ1' of FIG. 1) of the light of the light source module. According to FIG. 16, it is known that in case of different combinations of the thickness (which is also referred to as the cell gap) of the display medium and the light incline angles, four relationship curves of voltage and transmittance are obtained. However, in the above four curves, the required driving voltages corresponding to the highest transmittance are far smaller than the driving voltage (193 Vrms) required by the conventional IPS display module.

Comparison of Hysteresis Phenomenon

The blue phase liquids crystal generally have a hysteresis phenomenon, and when the blue phase liquid crystals are used as the display medium of the display device, the hysteresis phenomenon is generally required to be suppressed or decreased to avoid the hysteresis phenomenon of the blue phase liquid crystals influencing the accuracy of gray-level manipulation of the display module.

Figure 17:
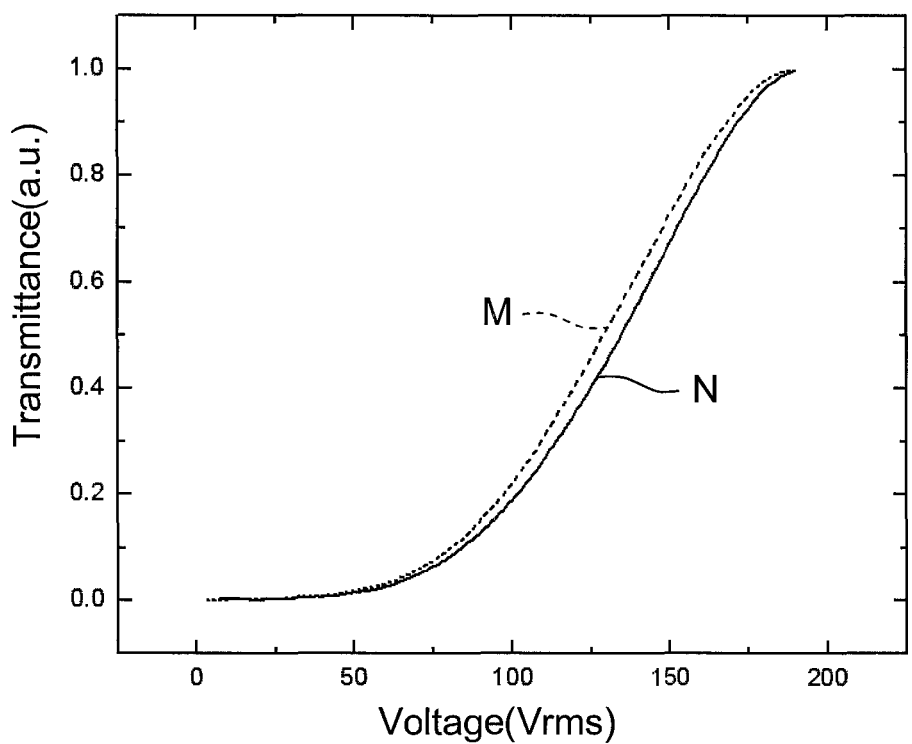
FIG. 17 is a measuring result of a hysteresis phenomenon of blue phase liquid crystals driven by a horizontal electric filed of the conventional IPS display module.
Figure 18:
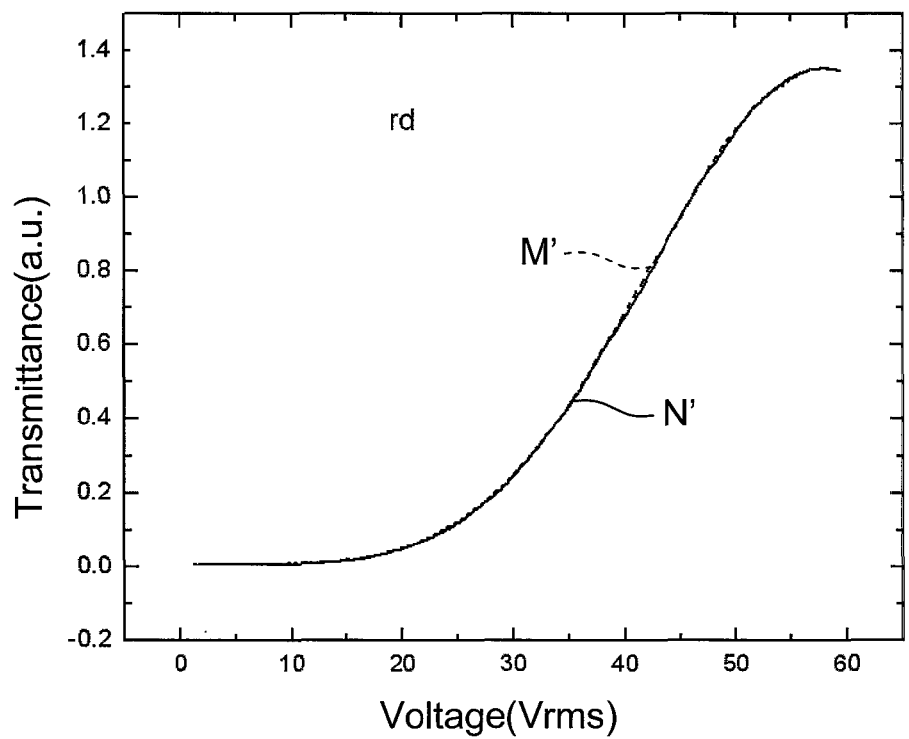
FIG. 18 is a measuring result of a hysteresis phenomenon of blue phase liquid crystals driven by a vertical electric filed of a display device of the invention.

FIG. 17 is a measuring result of a hysteresis phenomenon of blue phase liquid crystals driven by a horizontal electric filed of the conventional IPS display module. FIG. 18 is a measuring result of a hysteresis phenomenon of blue phase liquid crystals driven by a vertical electric filed of the display device of the invention. Generally, a method of measuring the hysteresis phenomenon of the blue phase liquid crystals is to gradually increase a voltage to measure voltage and transmittance curves M and M', and gradually decreases a voltage to measure voltage and transmittance curves N and N', and then a voltage difference of the two curves M and N (M' and N') under a condition of half transmittance is calculated. The greater the voltage difference of the two curves M and N (M' and N') is, the more obvious the hysteresis phenomenon of the blue phase liquid crystals is. Comparatively, the smaller the voltage difference of the two curves M and N (M' and N') is, the smaller the hysteresis phenomenon of the blue phase liquid crystals is.

According to FIG. 17 and FIG. 18, it is known that the hysteresis phenomenon of the blue phase liquid crystals driven by the horizontal electric filed of the conventional IPS display module is higher due to that the voltage difference of the two curves M and N (FIG. 17) under the condition of half transmittance is obviously greater than the voltage difference of the two curves M' and N' (FIG. 18) under the condition of half transmittance.

Influence of Thickness of the Display Medium on Driving Voltages

Figure 19:
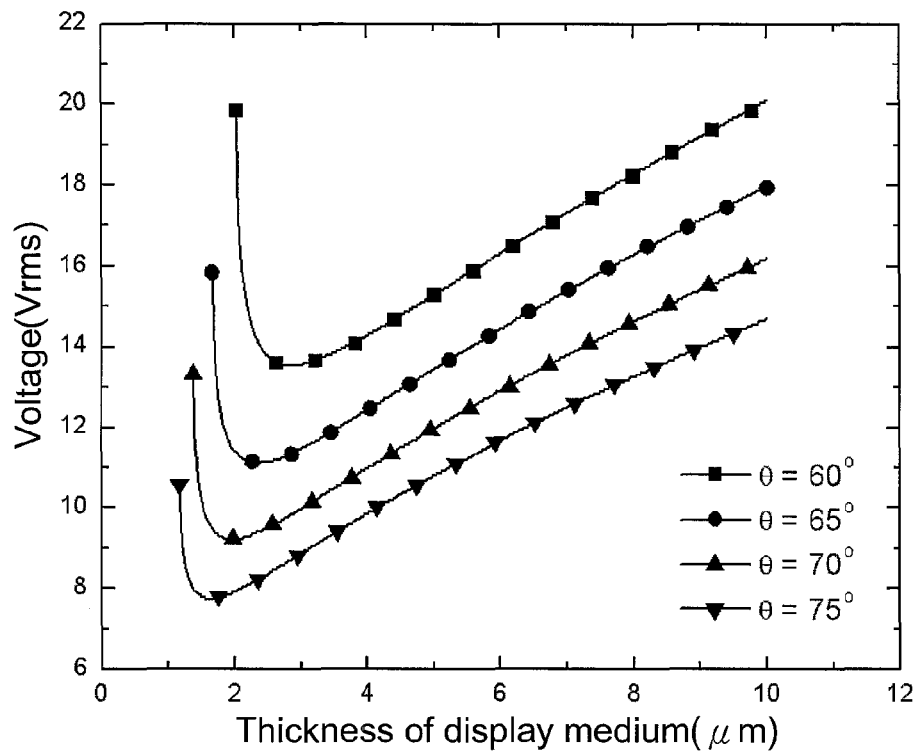
FIG. 19 is a relationship diagram of display medium thickness and voltages of a display device of the invention.

FIG. 19 is a relationship diagram of display medium thickness and voltages of a display device of the invention. A horizontal axis of FIG. 19 represents the thickness (the cell gap) of the display medium, and a vertical axis represents voltages (V). In FIG. 19, a laser light of 550 nm is used to serve as the light of the light source module, $\theta$ represents an incline angle (i.e. the angle $\theta 1'$ of FIG. 1) of the light of the light source module, and the four curves of FIG. 19 all corresponds to a situation that the display module has the Kerr constant of 10.2 nm/V$^2$. According to FIG. 19, it is known that the smaller the thickness (the cell gap) of the display medium is, the smaller the required driving voltage is.

Figure 20:
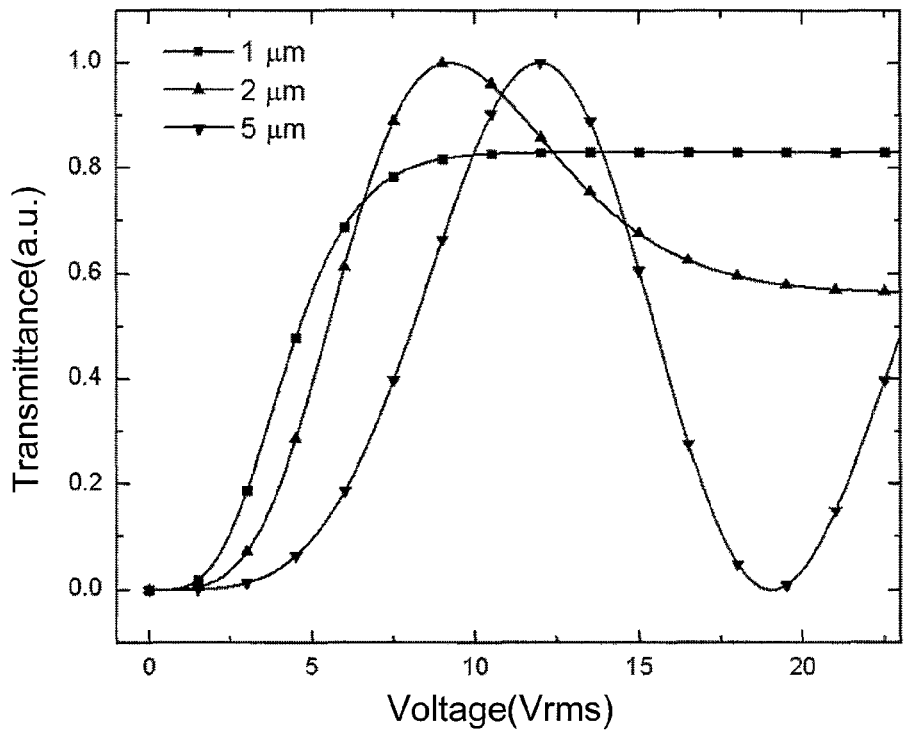
FIG. 20 is a relationship diagram of voltages and transmittances in case of different display medium thickness of a display device of the invention.

FIG. 20 is a relationship diagram of voltages and transmittances in case of different display medium thickness of a display device of the invention. A horizontal axis of FIG. 20 represents voltages (V), and a horizontal axis represents transmittances. In FIG. 20, the thickness (the cell gap) of the display medium are respectively 1, 2 and 5 μm, and the laser light of 550 nm serves as the light of the light source module, and an incline angle (i.e. the angle $\theta 1'$ of FIG. 1) of the light of the light source module is 70 degrees. According to FIG. 20, it is known that the driving voltage of the display device of the invention is related to the thickness of the display medium.

In summary, in the display module of the invention, the vertical electric field is generated between the pixel array and the electrode layer to drive the display medium of the display module. Particularly, since when the light generated by the light source module enters the display medium, the incident direction of the light is not perpendicular to the inner surface of the first substrate, when the display medium is driven to be optically anisotropic, it still has a birefringence property relative to the light of the light source module. According to the above descriptions, since the display device of the invention applies the vertical electric field to drive the display medium, the problems of low transmittance and high driving voltage of the conventional technique occurred when a horizontal electric filed is used to drive the blue phase liquid crystals can be avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device, comprising:
a light source module, generating directional light;
a display module, disposed above the light source module and having a vertical electric field therein, and the display module comprising:
   a first substrate, having a first inner surface and a first outer surface;
   a second substrate, disposed opposite to the first substrate and having a second inner surface and a second outer surface, wherein the vertical electric field is formed between the second inner surface and the first inner surface; and
   a display medium, disposed between the first substrate and the second substrate, wherein the display medium is optically isotropic, and the display medium is optically anisotropic when it is driven by the vertical electric field, and when the directional light enters the display module, the directional light is not perpendicular to the first outer surface, wherein a first included angle between the incident direction that the directional light of the light source module enters the display module and the first outer surface of the first substrate is between 5 degrees~45 degrees, and when the directional light exits the display module, it is not perpendicular to the second outer surface, wherein the display medium comprises blue phase liquid crystals; and
a guiding optical film, disposed on the second outer surface of the second substrate of the display module and having a light incident surface and a light emitting surface, wherein the directional light enters the guiding optical film from the light incident surface and exits the guiding optical film through the light emitting surface to form emitting light, and a second included angle is between an emitting direction of the emitting light and the light emitting surface.

2. The display device as claimed in claim 1, wherein the second included angle is 60 degrees~120 degrees.

3. The display device as claimed in claim 2, wherein the second included angle is 90 degrees.

4. The display device as claimed in claim 1, wherein an incident direction that the directional light of the light source module enters the display module is substantially not perpendicular to the first outer surface of the first substrate.

5. The display device as claimed in claim 1, further comprising:
a first optical film, disposed on the first outer surface of the first substrate, and having a plurality of first optical structures, wherein when the directional light passes through the first optical structures, total reflection of the directional light is substantially not produced; and
a second optical film, disposed on the second outer surface of the second substrate, and having a plurality of second optical structures, wherein when the directional light passes through the second optical structures, total reflection of the directional light is substantially not produced.

6. The display device as claimed in claim 5, wherein sizes of the first optical structures, the second optical structures and the optical structures are respectively 5 μm~100 μm.

7. The display device as claimed in claim 5, wherein the first optical film has a first surface and a second surface opposite to the first surface, the first surface faces to the light source module, the second surface faces to the first outer surface of the first substrate, and the first optical structures are located on the first surface.

8. The display device as claimed in claim 7, wherein the first optical structures are respectively a groove structure having a first sidewall and a second sidewall, and a second incident direction of the directional light passing through the first optical film is perpendicular to the first sidewall, and the second incident direction is parallel to the second sidewall.

9. The display device as claimed in claim 5, wherein the second optical film has a first surface and a second surface opposite to the first surface, the first surface faces to the second outer surface of the second substrate, and the second optical structures are located on the second surface.

10. The display device as claimed in claim 9, wherein the second optical structures are respectively a groove structure having a first sidewall and a second sidewall, and a third incident direction of the directional light passing through the second optical film is perpendicular to the first sidewall, and the third incident direction is parallel to the second sidewall.

11. The display device as claimed in claim 5, further comprising:
   a lower polarizer, located on the first outer surface of the first substrate; and
   an upper polarizer, located on the second outer surface of the second substrate,
   wherein the upper polarizer is located between the second substrate and the guiding optical film, or the guiding optical film is located between the upper polarizer and the second optical film.

12. The display device as claimed in claim 11, wherein an angle between a transmission axis of the lower polarizer and a transmission axis of the upper polarizer is 5 degrees~175 degrees.

13. The display device as claimed in claim 1, wherein the guiding optical film has a first surface and a second surface opposite to the first surface, the first surface faces to the second outer surface of the second substrate, and a plurality of guiding optical structures are disposed on the first surface of the guiding optical film.

14. The display device as claimed in claim 13, wherein the guiding optical structures are respectively a groove structure having a first sidewall and a second sidewall, and total reflection of the directional light is produced at the first sidewalls of the guiding optical structures to form the emitting light.

15. The display device as claimed in claim 14, wherein the first sidewall and the second sidewall of each of the groove structures are all flat sidewalls.

16. The display device as claimed in claim 14, wherein the first sidewall of each of the groove structures is a curved sidewall, and the second sidewall of each of the groove structures is a flat sidewall.

17. The display device as claimed in claim 16, wherein the curved sidewalls respectively have a radius of curvature, and the radius of curvatures of the curved sidewalls are completely identical or are not completely identical.

18. The display device as claimed in claim 16, wherein each of the curved sidewalls has a plurality of radius of curvatures, and the radius of curvature of the curved sidewall closer to the bottom of the groove structure is smaller.

19. The display device as claimed in claim 1, wherein the display module further comprises at least one alignment pattern disposed on at least one of the first substrate and the second substrate.

* * * * *